Jan. 25, 1966  W. C. MILLIGAN  3,231,202
CATALYTIC INFRARED HEATING DEVICE
Filed July 30, 1963
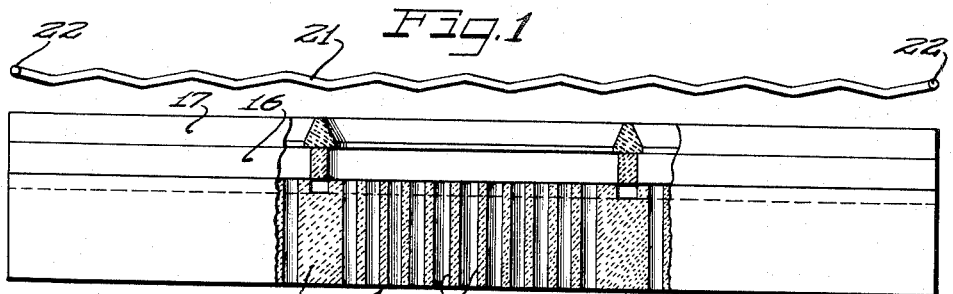
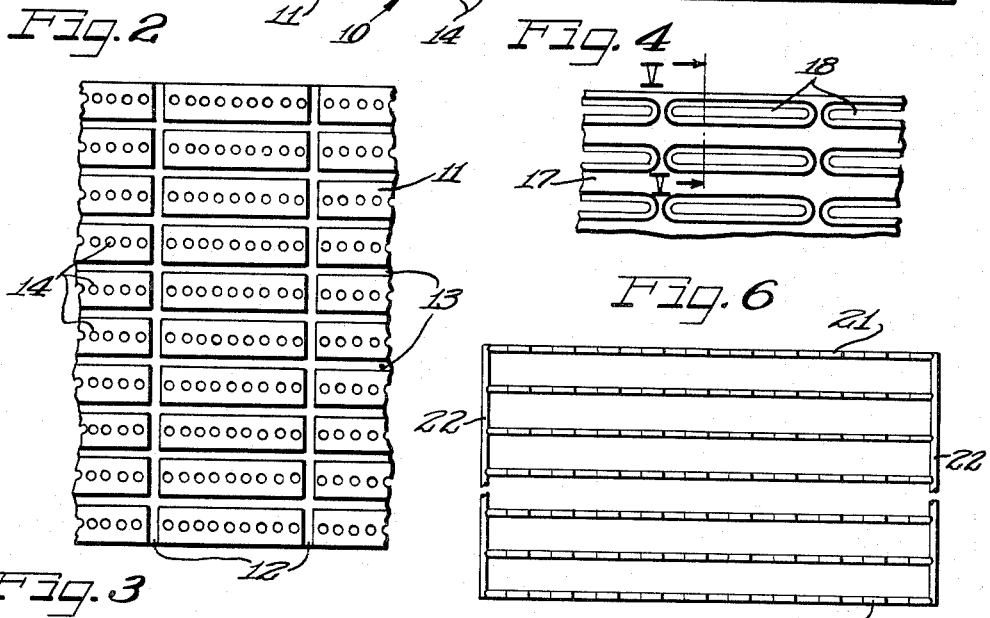
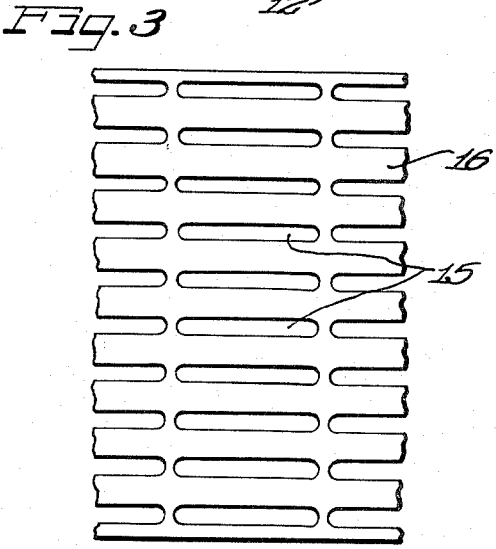
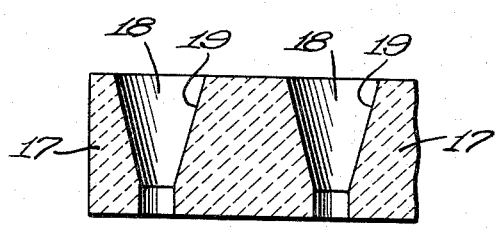
INVENTOR.
William C. Milligan
BY
Hill, Sherman, Meroni, Gross & Simpson
ATTORNEYS United States Patent Office 3,231,202
Patented Jan. 25, 1966

3,231,202
CATALYTIC INFRARED HEATING DEVICE
William C. Milligan, 1618 San Angelo Blvd.,
San Antonio 1, Tex.
Filed July 30, 1963, Ser. No. 298,759
2 Claims. (Cl. 239—500)

The present invention relates to an apparatus for heating by catalytic combustion.

Catalytic heaters in the past have employed catalysts composed at least in part of rare metals such as platinum, palladium, rhodium, and the like. These catalysts are not only expensive but they have not been used to greatest advantage in the structures of the past.

In prior applications for patent, I have described various catalytic heating systems which are efficient in the production of substantial quantities of infrared radiation. Such systems provide substantially higher utilization of the infrared energy derived from the flameless combustion of a gaseous fuel than other catalytic heating units. Furthermore, they insure substantially complete combustion of the gases and substantially eliminate the dangers of explosion and toxicity arising from the presence of incompletely oxidized gases in the products of combustion.

The present invention represents an improvement over the catalytic heating units of my prior applications in several particulars. The devices of the present invention are easier to manufacture and assemble, thereby cutting down the overall cost of the unit. Furthermore, the devices of the present invention consist of a number of components whose radiation characteristics and catalytic activity can be predetermined so that a maximum amount of controlled infrared radiation can be obtained using inexpensive materials.

An object of the invention is to provide an improved catalytic heating unit which provides controlled infrared radiation.

Still another object of the invention is to provide an improved catalytic heating unit in which the radiation characteristics and the catalytic activity of the components of the assembly can be pre-matched prior to assembly to secure the most efficient results.

Still another object of the invention is to provide an economical catalytic heater unit which can be fabricated from readily available raw materials.

In accordance with the present invention, I provide a heating unit which includes a base composed of a relatively dense, substantially non-catalytic material. In the base, there are provided rows of apertures for passing the fuel gases therethrough. A grid is disposed over the base, the grid being composed of a more porous material than the base, the grid being capable of substantial infrared radiation. The grid also has pronounced catalytic activity at the operating temperature of the heating unit. The grid is also provided with openings therein in registry with the apertures in the base to accommodate the flow of combustion gases through the base and the grid.

In the preferred embodiment of the invention a second grid is interposed between the base and the aforementioned grid, the second grid being composed of a material of low heat conductivity, such as a compressed mat of ceramic fibers. The second grid has openings in registry with the openings of the first grid to accommodate the flow of combustion gases and is interposed to limit the heat radiated back to the base from the first mentioned grid.

A further description of the present invention will be made in conjunction with the attached sheet of drawings which illustrate a preferred embodiment of the invention.

In the drawings:

FIGURE 1 is a view in elevation of the catalytic heating unit;

FIGURE 2 is a plan view of the base of the unit;

FIGURE 3 is a plan view of the intermediate grid assembly shown in FIGURE 1;

FIGURE 4 is a plan view of the principal grid shown in the assembly of FIGURE 1;

FIGURE 5 is a fragmentary cross sectional view taken substantially along the line V—V of FIGURE 4; and FIGURE 6 is a plan view of the radiating elements which can be employed for the purposes of the present invention.

As shown in the drawings:

In FIGURE 1, reference numeral 10 indicates generally the catalytic heating unit of the type to which the present invention pertains. The unit 10 includes a base 11 composed of a relatively dense, substantially non-catalytic material. Suitable materials for the base 10 include clays of the type used in insulating firebrick construction (usually containing kaolin, ball clays, and the like with fluxes) or an alumina brick used for high temperature work and normally consisting of more than about 90% alumina. As best seen in FIGURE 2, the base 11 is subdivided into a plurality of brick-like sections by means of channels 12 and 13 which serve to introduce secondary combustion air along the face of the base 11. A plurality of apertures 14 is provided in spaced rows to accommodate the flow of a combustible fuel gas therethrough.

Immediately above the base 11 there may be interposed a grid 16 composed of a compressed mat of ceramic fibers or the like. Typical materials for use in this connection are the products known as "Kaowool" marketed by Babcock and Wilcox and the product known as "Fiberfrax" marketed by the Carborundum Company. These materials can withstand temperatures on the order of 2,000 to 3,000° F. and have a density of about 8 pounds per cubic foot. The ceramic fiber grid 16 reduces the thermal conductivity from the primary grid 17 located above it to the base 11. It is not completely necessary that the grid 16 be formed of a fibrous material, as a porous ceramic body can also be used, but the fiber is preferred because it is flexible and provides more readily for expansion and contraction upon heating and cooling. The grid 16 is also provided with openings 15 which are arranged to be in registry with the apertures 14 when the grid 16 is placed over the base 11.

The principal grid 17 is composed of a material which has pronounced catalytic activity at the operating temperature of the heating unit. For reasons of economy, I prefer to use a material which has substantially no catalytic activity at room temperature but which has pronounced catalytic activity at temperatures above about 1,300° F. Suitable materials for the grid include porous clays of the kaolin, ball, or talc types. It is important that the material have a high pore volume area and a high porosity. This is necessary to obtain maximum gas reaction area for a given total volume available. The pore volume area required for maximum efficiency will vary from approximately 100 square meters per gram to in excess of 900 square meters per gram. There is no upper limit since the larger the area available for reaction, the greater the efficiency. The lower limit in respect to pore volume is given by the minimum amount of efficiency that can be permitted for a given design because, generally speaking, the lower the pore volume area per gram, the lower the catalytic efficiency will be.

Clays of the type described can be fired at various temperatures to obtain suitable strength properties. In order to minimize the amount of vitrification which might occur on firing, it is desirable to add stabilizers such as alumina or zirconia to the clay material before firing.

The very large number of minute holes which must be present in the structure of the grid can be achieved by a number of techniques, such as the use of chemical foaming, the use of burnout material, or the use of bloated aggregate material or the like. As a specific example, it has been found that from 25 to 100% by weight of wood or walnut flour added to a clay formula has provided good results if the burnout material is at least 100 mesh size or smaller and preferably from 200 to 300 mesh. When fired at proper temperatures, the wood or walnut flour burns out leaving correspondingly small holes throughout the ceramic structure. A larger volume of minute holes left in the ceramic structure permits very high catalytic activity rates, at low cost.

The material of the grid 17 should have a very low thermal conductivity consistent with adequate strength. The low thermal conductivity is important since it is desirable that the high temperatures existing on the radiating surfaces of the grid do not appear on the rear surface of the grid. Otherwise, the zone of maximum heat will gradualy creep back toward the rear of the ceramic, and this will tend to reduce the peak temperatures obtainable at the radiating surface.

Substantially greater infrared radiation is obtained when the grid is provided with at least a surface coating of an efficient infrared reflecting material. For example, materials such as silicon carbide or dark colored oxides can be suspended in a liquid vehicle and then used to impregnate the surface of the porous material. Typically, the material of the grid 17 has a porosity from 25 to 90%, and usually from 50 to 80%. In view of this high porosity, the finely divided powder impregnant does not substantially close the surface pores to an excessive degree but still provides an efficient infrared radiator. Since the catalytic surface has a low mass density and thickness, it is able to raise the temperature of the minute particles of silicon carbide to a very high value, much more efficiently than if the entire base were made of silicon carbide.

It is also possible to spray on a mixture of a catalyst and an efficient radiating material to the grid 17 in order to increase the overall temperature of the surface. One of the advantages from this method is that the impregnated materials are in the form of minute particles, and therefore their expansion and contraction properties do not significantly affect the base material.

Additional advantages can be gained by adding a thixotropic agent to the grid, one such agent being a quartz powder in sub-micron size sold under the trade name "Cab-O-sil." A relatively small amount of this material mixed in with a spraying solution has certain advantages. First, it helps to suspend the heavy metal powders in the solution to make it easier to spray or otherwise apply the solution to the ceramic surface. Second, the very finely divided material acts as seed crystals under high temperature conditions so that vitrification proceeds to the point of sintering the metal powder and the thioxotropic agent to the ceramic surface. Third, the material itself, being an active form of silica, also acts as a catalytic agent.

Another material which acts in substantially the same way is the sub-micron aluminum oxide known as "Alon C."

As best seen in FIGURES 4 and 5, the grid 17 is provided with openings 18 consisting of slots defined by diverging walls 19, the slots 18 being arranged to be in registry with the opening 15 of the ceramic mat 16, and overlying the apertures 14 of the ceramic block 11. Thus, when the block 11, the grid 16 and the grid 17 are superimposed as illustrated in FIGURE 1, the fuel gas can readily flow through the apertures 14 outwardly to the outer surface of the grid 17 where a major portion of the infrared radiation takes place.

The unit is preferably combined with a plurality of undulating heat radiating elements 21 supported between a pair of rods 22. These radiators can be made of suitable metal or ceramic material and can be formed into corrugated half-moon, semi-circular, or other configurations as well as the V-shaped configuration illustrated in the drawings. A sufficient number of the radiators 21 is provided in side-by-side relation to provide adequate infrared feedback and outward radiation. One of the advantages of having the radiator system present is that there is substantially less interference to the emission of infrared radiation at almost any angle than from straight rods or flat plates.

The radiating elements can be placed quite close to the base and this closer spacing allows higher temperatures to be obtained at the base with less back pressure effects on the hot gases and more efficient infrared feedback to the base. The presence of the increased length and mass within a given area also increases the amount of radiation produced. The V's or corrugations can also be used to increase the radiation angles or to concentrate them in certain directions.

One of the main advantages of the assembly shown in the drawings is that a very wide range of flexibility in design for heat output purposes and for manufacturing cost and facility is gained by separating the structure into a base and one or more grids. For example, catalysts can be added in a simple manner for quick heat-up and higher heat output but with a minimum of expense since the base does not have to be treated with a catalyst. Furthermore, the grid can be made of materials having much higher thermal conductivity than practical for the base in order to assist in the high output of infrared energy. All of the parts are easily assembled or easily replaced if broken. They are normally quite rugged in service and no difficulty has been experienced from thermal shock and the like with materials made from proper formulas. Also, the problems resulting from expansion and contraction have been substantially minimized.

With a radiator construction 21 as illustrated in the drawings, the hot gases have a much better opportunity to flow over and heat a substantial portion of the radiators. A much larger portion of the radiators is exposed and this permits more radiation output through the radiating elements at wider angles than is normally obtainable with flat plates or rods or the like. In addition, excellent re-radiation back to the grid 17 is obtained and this builds up the temperature of the grid which in turn allows greater radiation to be transmitted outwardly. Accordingly, the use of the improved radiator construction permits increased radiation surface, higher temperatures, and good expansion and contraction characteristics.

It should be evident that various modifications can be made to the described embodiments without departing from the scope of the present invention.

I claim as my invention:

1. A heating unit comprising a base composed of a relatively dense, substantially non-catalytic material, said base having rows of apertures therein for passing a fuel gas therethrough, a first grid disposed over said base, said grid having a relatively high pore volume area and a high natural porosity and being capable of substantially greater infrared radiation than said base, said grid having pronounced catalytic activity at the operating temperature of said heating unit, said grid also having openings therein in registry with said apertures to accommodate flow of combustion gases therethrough, and a second grid composed of a material of low heat-conductivity interposed between said base and said first grid, said second grid having openings in registry with the openings of said first grid.

2. The heating unit of claim 1 in which said second grid is composed of a compressed mat of ceramic fibers.

(References on following page)

References Cited by the Examiner

UNITED STATES PATENTS

| | | | |
|---|---|---|---|
| 1,223,248 | 4/1917 | Bone et al. | 158—99 |
| 1,249,366 | 12/1917 | Fisher | 158—99 |
| 1,259,029 | 3/1918 | Lucke | 158—99 |
| 1,308,364 | 7/1919 | Lucke | 158—99 |
| 1,345,377 | 7/1920 | Linbarger. | |
| 2,081,657 | 5/1937 | Balthis. | |
| 2,194,208 | 3/1940 | Moran | 158—99 |
| 2,506,244 | 5/1950 | Stopka | 25—156 |
| 2,564,708 | 8/1951 | Mochel. | |
| 2,867,207 | 1/1959 | Fulmer. | |

FOREIGN PATENTS

| | | |
|---|---|---|
| 240,788 | 12/1959 | Australia. |
| 799,159 | 3/1936 | France. |
| 1,228,433 | 8/1960 | France. |
| 1,228,434 | 8/1960 | France. |
| 464,692 | 8/1928 | Germany. |
| 521,090 | 3/1955 | Italy. |

OTHER REFERENCES

Fuels and Their Combustion, Haslam and Russell, McGraw-Hill Book Co., Inc., 370 Seventh Ave., New York City, 1926, p. 305.

FREDERICK L. MATTESON, Jr., *Primary Examiner.*

JAMES W. WESTHAVER, *Examiner.*